United States Patent [19]

Vogt

[11] 4,321,498
[45] Mar. 23, 1982

[54] SUB-SLOT COVER FOR GENERATOR FIELD

[75] Inventor: George H. Vogt, Topsfield, Mass.

[73] Assignee: General Electric Company, Lynn, Mass.

[21] Appl. No.: 896,721

[22] Filed: Apr. 17, 1978

[51] Int. Cl.³ .............................................. H02K 3/34
[52] U.S. Cl. ..................................... 310/215; 310/214
[58] Field of Search .............. 310/58, 59, 60 R, 60 A, 310/61, 64, 65, 261, 213, 214, 215, 194, 45; 336/60

[56]   References Cited
   U.S. PATENT DOCUMENTS

| 2,783,399 | 2/1957 | Fenemore | 310/64 |
| 2,990,487 | 6/1961 | Stigler | 310/214 |
| 3,634,709 | 1/1972 | Le Henaff | 310/214 |
| 4,163,166 | 7/1979 | Kamiya | 310/215 |

FOREIGN PATENT DOCUMENTS

| 751568 | 1/1967 | Canada | 310/214 |
| 1538935 | 5/1970 | Fed. Rep. of Germany | 310/214 |
| 49-44300 | 4/1974 | Japan | 310/215 |
| 155588 | 9/1932 | Switzerland | 310/215 |
| 1456068 | 11/1976 | United Kingdom | 310/214 |

Primary Examiner—R. Skudy
Attorney, Agent, or Firm—James W. Mitchell

[57]   ABSTRACT

The rotating field of a dynamoelectric machine comprises a rotor having electrically conductive windings extending along the axial length of the rotor. The windings are disposed in axially extending slots and the slots include electrical insulation for preventing the transfer of electric current between the windings and the rotor body. A direct cooled generator field is one which is cooled by the atmosphere surrounding the field; e.g., hydrogen or air, and is designed so that the gas coolant is pumped radially through the windings and axially through sub-slots in the rotor body. The present invention is concerned with sub-slot covers which are designed to improve the electrical insulating properties of the cover by increasing the electrical path length between the windings and the rotor body and by obviating the formation of electrical paths due to the possible accumulation of foreign material.

8 Claims, 4 Drawing Figures

SUB-SLOT COVER FOR GENERATOR FIELD

BACKGROUND OF THE INVENTION

This invention relates to dynamoelectric machines and, in particular, to direct cooled dynamoelectric machines of the type including a rotating field comprising electrically conductive windings disposed in a plurality of axially extending slots.

The rotating field of a dynamoelectric machine includes a rotor body having a plurality of axially extending slots into which the electrical windings are inserted. The rotor body is generally a steel material whereas the rotor windings comprise a plurality of copper wires. In a direct cooled dynamoelectric machine each slot may further include an axially extending sub-slot for ventilation and cooling. The direct cooled machine is one which is cooled directly by the atmosphere in which it is disposed; e.g., air or hydrogen. The sub-slots are part of a ventilation scheme, known in the art, for transferring gas coolant axially along the rotor. Each slot also includes provision for the radial flow of gas coolant primarily through ventilation slots in the windings.

In the afore-described machine it is necessary to electrically insulate the rotor windings from the rotor body such insulation taking the form of non-conductive "slot armor." Moreover, it has been the practice of some manufacturers to provide sub-slot covers which increase the insulation of the bottom of the slot. In a direct cooled dynamoelectric machine wherein the machine coolant is air it is possible that foreign material may accumulate on sub-slot surfaces in such a way as to reduce electrical creepage distances and lead to low insulation resistance or a grounded field.

It is one object of the present invention to provide an improved sub-slot cover for a dynamoelectric machine rotating field.

It is another object of the present invention to provide an improved sub-slot cover for a dynamoelectric machine field which increases the electrical creepage distances between the field windings and the rotor.

It is still another object of the present invention to provide an improved sub-slot cover for a direct cooled dynamoelectric machine field which reduces the possibility of inadvertent grounding of the field windings which may be caused by the accumulation of foreign deposits.

The novel features believed characteristic of the present invention are set forth in the appended claims. The invention itself, however, together with further objects and advantages thereof, may best be understood with reference to the following description taken in connection with the appended drawings.

SUMMARY OF THE INVENTION

In accordance with the foregoing objects of the invention a sub-slot cover is formed to be inserted along the axial length of a winding slot. The sub-slot cover is inserted into the slot and the coils are thereafter laid onto the sub-slot cover. One unique feature of the sub-slot cover construction is a pair of oppositely directed grooves or slots formed on each side of the sub-slot cover and into which one end of the slot armor is inserted. Interlocking of the slot armor and sub-slot cover extends the length of the electrical creepage path.

A second feature in accordance with one embodiment of the invention is provided by a pair of fins which extend radially inwardly into the sub-slot to interrupt the generally flat configuration of the sub-slot cover thereby increasing once again the electrical creepage path by obviating the accumulation of foreign material on the underside of the sub-slot cover.

DETAILED DESCRIPTION OF THE INVENTION

Figure 1:
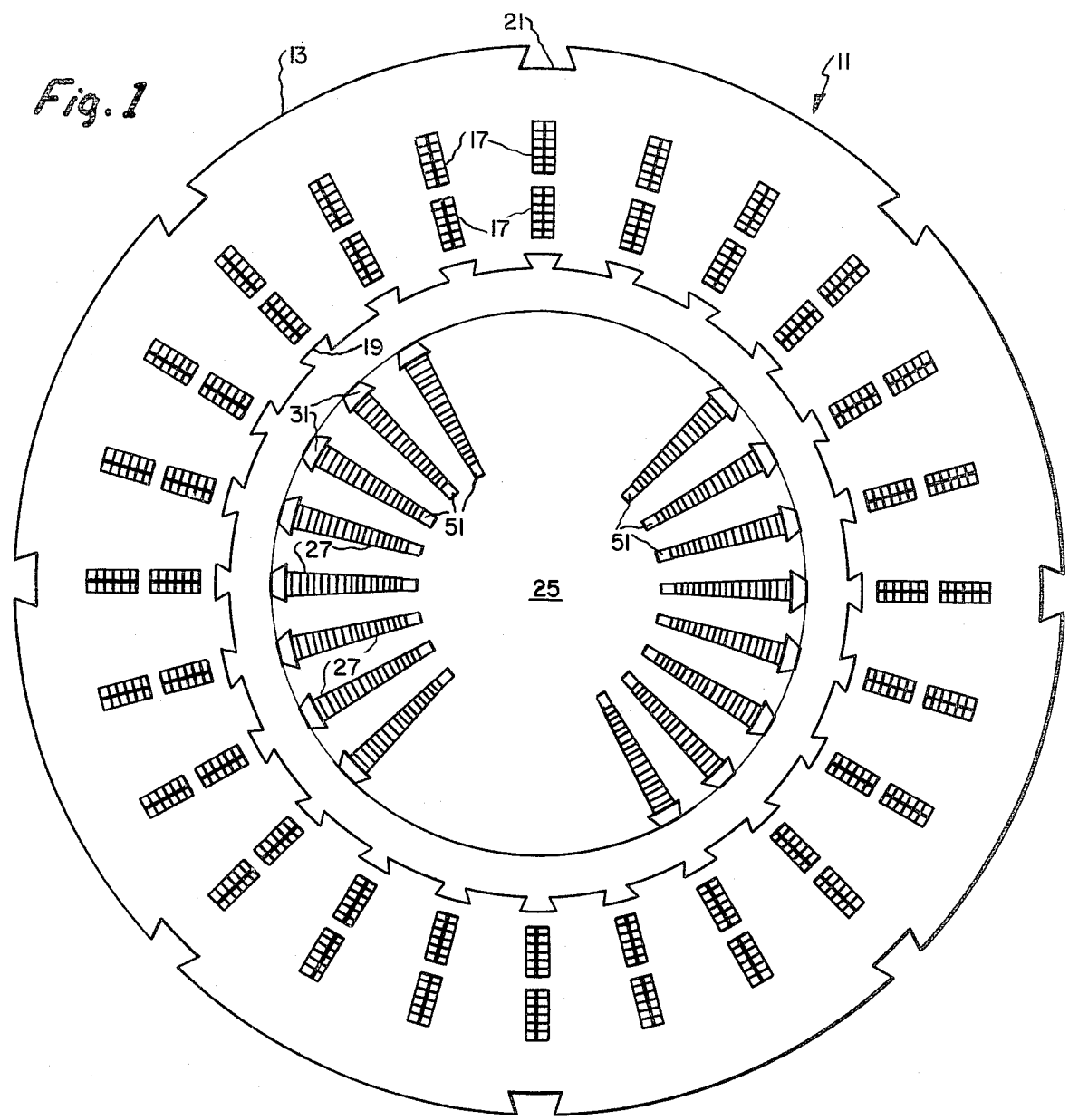
FIG. 1 is an end view of a generator rotor and stator showing in cross-section the electrical field and armature windings.

FIG. 1 shows an end view schematic partially in cross-section of a dynamoelectric machine 11 which includes a frame mounted stationary armature core or stator 13 comprising a plurality of stacked laminations having axially directed electrically conductive armature bars 17 running the length of the machine and terminating in end windings at each end of the dynamoelectric machine. The reader will note that only a portion of this well known construction has been shown, the exact details of which are generally available and not particularly germane to the present invention except by way of explanation. The radially inner dovetail slots 19 and the radially outer dovetail slots 21 accommodate stator wedges and keybars respectively (not shown) which maintain the alignment and spacing of stator core laminations. The stator bars carry induced current to the dynamoelectric machine terminals.

A rotor 25 is positioned co-axially within the stator core and includes a cylindrical steel rotor body in which there are a plurality of field windings 27. The field windings are electrically conductive members; e.g., copper, which carry excitation current into the dynamoelectric machine. The rotor is rotatably supported at each end of the dynamoelectric machine on bearings well known in the art. The field windings are held in place against centrifugal forces by dovetail wedges 31.

Figure 2:
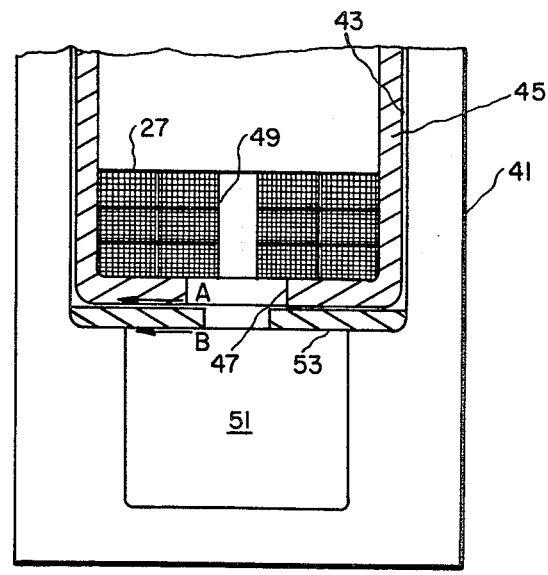
FIG. 2 is a prior art showing of a rotor slot and sub-slot including several strands of field windings.
Figure 3:
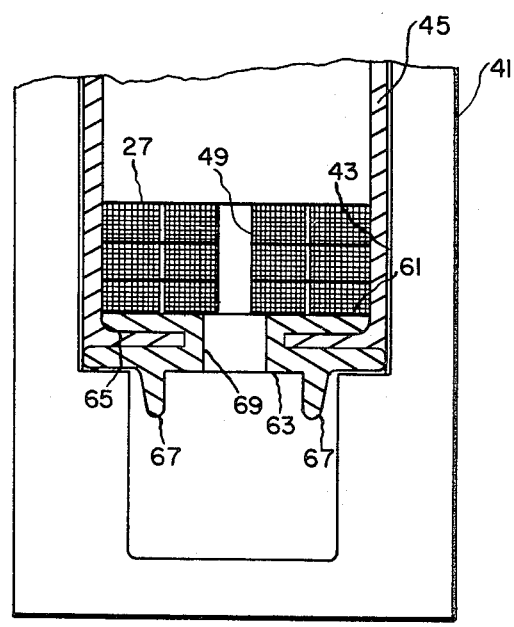
FIG. 3 is a cross-section view similar to FIG. 2 updating the prior art with one embodiment of the applicant's invention.

Referring to FIGS. 2 and 3, the prior art and the applicant's invention are shown relative to a single rotor winding in that respective order. The drawings show a portion of the rotor steel 41 which has a channel shaped slot 43 formed therein to accept the rotor field windings 27. The windings are current carrying copper wires which must be electrically insulated from the rotor steel. This is accomplished by so called slot insulation including slot armor 45, a channel shaped piece of glass laminate having spaced ventilation slots 47 along the axial length of the piece. The ventilation slots 47 are in register with radial openings 49 up through the field windings.

In a direct cooled machine, the field windings are cooled by the surrounding gaseous atmosphere by being pumped radially through the windings and axially through the rotor sub-slots 51. The slot insulation is further enhanced by a sub-slot cover 53 which is interposed between the sub-slot and the slot armor.

In order to understand the advantages of the present invention we must look into the disadvantages of the prior art. The problem involves current leakage paths which might lead to a grounded field. These paths are indicated by the arrows A and B superposed on FIG. 2. Arrow A indicates a leakage path between the slot armor 45 and the sub-slot cover 53. Arrow B indicates a leakage path on the radially inner surface of the sub-slot cover, this latter path being a low resistance path generated by the deposit of minute particles of foreign matter being thrown in the radially outward direction by centrifugal force. The minute particles are carried into the machine from the surrounding environment by the coolant gas.

Figure 4:
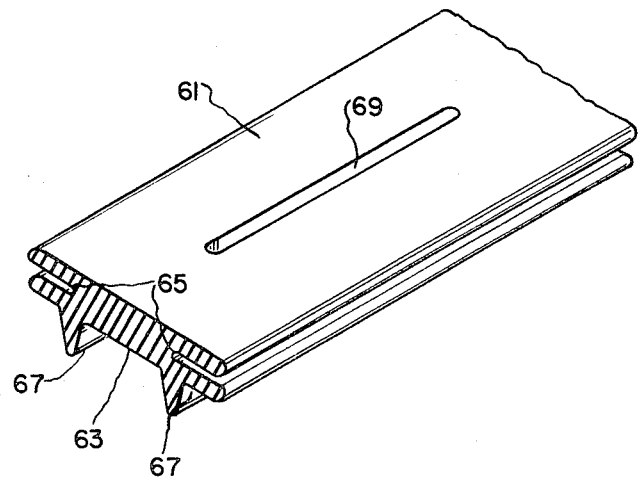
FIG. 4 is a perspective view of a new sub-slot cover according to the applicant's invention.

The present invention is shown in a preferred embodiment in FIG. 4. The sub-slot cover according to the present invention is a substantially planar member which includes an upper (radially outer) surface 61 and a lower (radially inner) surface 63. Between the two surfaces, there are two oppositely directed grooves or slots 65 which are made to interlock with the slot armor. The slots extend along the axial length of the sub-slot cover. Returning to FIG. 3, the effect of this construction is to obviate leakage path A demonstrated in FIG. 2. Again, it is the interlock between the grooves in the sub-slot cover and the base legs of the slot armor which forms a part of this invention.

Continuing with the detailed description of the present invention, the lower or radially inner surface of the sub-slot cover is formed with a pair of radially inwardly extending fins 67 which also extend along the axial length of the sub-slot cover. The fins extend radially inwardly into the sub-slot and it is the intent of this description to describe the invention concept as at least one radially inwardly extending member. The function of the fin is to obviously extend the leakage path based upon that leakage path B indicated in FIG. 2. It is not so apparent that the fins provide walls to which minute particles cannot cling as they are flung in the radially outward direction by centrifugal force and hence, the walls become barriers to electrical leakage vis-a-vis path B. The improved sub-slot cover is also formed with a ventilation slot 69 and may be made of any suitable insulating material such as glass laminate.

While there has been shown what is considered to be a preferred embodiment of the present invention other modifications may occur to those having skill in the art. It is intended to cover in the appended claims all such modifications which fall within the true spirit and scope of the claims.

What is claimed is:

1. In a dynamoelectric machine including a rotor having formed therein axially extending slots for receiving a plurality of electrical conductors, means are provided for electrically insulating said conductors from said rotor body comprising:
   at least one pair of electrically insulating members, each member comprising a radially extending portion terminating in a base leg, said electrically insulating members disposed in each slot so that the radially extending portions are adjacent opposite slot walls and said base legs extend toward one another; and,
   an axially extending substantially planar base member having opposite sides formed with axially extending grooves for accepting therein each opposite base leg whereby an interlocking joint is formed between the base member and each of said electrically insulating members.

2. The dynamoelectric machine recited in claim 1 wherein the rotor further includes axially extending sub-slots adjacent to said rotor slots and extending radially inwardly therefrom, said base member defining a sub-slot cover; and, wherein said base member further comprises:
   at least one fin extending radially inward into said sub-slot from said base member.

3. The dynamoelectric machine recited in claim 1 wherein the rotor further includes axially extending sub-slots adjacent to said rotor slots and extending radially inwardly therefrom, said base member defining a sub-slot cover between said slot and said sub-slot; and, wherein said base member further comprises:
   a pair of radial inwardly directed fins extending axially along the length of said sub-slot cover.

4. A sub-slot cover for a dynamoelectric machine comprising an electrically insulating member positionable between the field windings and a portion of the rotor body, said sub-slot cover comprising:
   a substantially planar member including at least one axially directed groove on each opposite side of said member.

5. The sub-slot cover recited in claim 4 further comprising at least one fin extending radially inward from said sub-slot cover into said sub-slot.

6. The sub-slot cover recited in claim 4 further comprising at least one pair of fins extending radially inward from said sub-slot cover into said sub-slot.

7. In a dynamoelectric machine having a rotor formed with axially extending slots and axially extending sub-slots, said slots for receiving electrical conductors, means are provided for electrically insulating said electrical conductors from said rotor material comprising:
   at least one first electrically insulating channel member having radially extending portions and a base portion said member disposed in said slot so that the radially extending portions are adjacent opposite slot walls;
   a second insulating member comprising a substantially planar member having opposite sides formed with axially extending grooves accepting therein a base portion in interlocking relationships; and,
   at least one pair of fins extending radially inward from said second insulating member into said sub-slot.

8. A sub-slot cover for a dynamoelectric machine comprising:
   a substantially planar member having opposite sides formed with axially extending grooves; and,
   at least one pair of fins on said planar member for insertion into a sub-slot.

* * * * *